US008112484B1

(12) United States Patent
Sharma et al.

(10) Patent No.: US 8,112,484 B1
(45) Date of Patent: Feb. 7, 2012

(54) APPARATUS AND METHOD FOR AUXILIARY CLASSIFICATION FOR GENERATING FEATURES FOR A SPAM FILTERING MODEL

(75) Inventors: Vipul Sharma, Sunnyvale, CA (US); Steve Lewis, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 1133 days.

(21) Appl. No.: 11/444,593

(22) Filed: May 31, 2006

(51) Int. Cl.
*G06E 1/00* (2006.01)
*G06E 3/00* (2006.01)
*H04L 9/00* (2006.01)
*H04L 29/00* (2006.01)

(52) U.S. Cl. ............. 709/206; 726/13; 713/154; 706/20

(58) Field of Classification Search ........... 709/203–207
See application file for complete search history.

(56) References Cited

U.S. PATENT DOCUMENTS

| | | | |
|---|---|---|---|
| 5,127,055 A | 6/1992 | Larkey | |
| 6,507,866 B1 | 1/2003 | Barchi | |
| 6,778,941 B1 | 8/2004 | Worrell et al. | |
| 7,340,376 B2 | 3/2008 | Goodman | |
| 2002/0199095 A1* | 12/2002 | Bandini et al. | 713/151 |
| 2004/0059697 A1 | 3/2004 | Forman | |
| 2004/0221062 A1 | 11/2004 | Starbuck et al. | |
| 2004/0243844 A1 | 12/2004 | Adkins | |
| 2004/0249895 A1 | 12/2004 | Way | |
| 2004/0260922 A1* | 12/2004 | Goodman et al. | 713/154 |
| 2005/0060643 A1 | 3/2005 | Glass | |
| 2005/0120019 A1 | 6/2005 | Rigoutsos et al. | |
| 2005/0193073 A1 | 9/2005 | Mehr et al. | |
| 2005/0262210 A1* | 11/2005 | Yu | 709/206 |
| 2006/0026152 A1 | 2/2006 | Zeng et al. | |
| 2006/0047769 A1 | 3/2006 | Davis et al. | |
| 2006/0095966 A1 | 5/2006 | Park | |
| 2006/0149821 A1 | 7/2006 | Rajan et al. | |

(Continued)

OTHER PUBLICATIONS

Ian H. Witten and Eibe Frank (2005) "Data Mining: Practical machine learning tools and techniques", 2nd Edition, Morgan Kaufmann, San Francisco, 2005.

(Continued)

*Primary Examiner* — Ian N Moore
*Assistant Examiner* — Thai N Nguyen
(74) *Attorney, Agent, or Firm* — Blakely Sokoloff Taylor & Zafman LLP

(57) ABSTRACT

A computer-implemented system and method are described for integrating a series of auxiliary spam detection models with a base spam detection model, thereby improving the accuracy and efficiency of the overall spam detection engine. For example, a system according to one embodiment of the invention comprises: a base spam filter feature extractor to detect a first set of features from incoming email messages; one or more auxiliary model feature extractors, each of the auxiliary model feature extractors to detect a different set of features from the incoming email messages; one or more auxiliary detection modules, each of the auxiliary detection modules to receive an indication of the different sets of features detected by a corresponding one of the auxiliary model feature extractor modules and to apply weights to the detected features; and a base spam filter module to receive an indication of the first set of features from the base spam filter feature extractor and the weights generated by the auxiliary detection modules, the base spam filter module to assign base spam filter weights to the first set of features and to determine whether an email message is spam based on the weights of the first set of features and the weights of the different set of features identified by the auxiliary model feature extractors.

9 Claims, 4 Drawing Sheets

U.S. PATENT DOCUMENTS

| | | | |
|---|---|---|---|
| 2006/0168041 | A1 | 7/2006 | Mishra et al. |
| 2006/0277259 | A1 | 12/2006 | Murphy et al. |
| 2007/0185963 | A1 | 8/2007 | Stauffer |
| 2009/0070872 | A1 | 3/2009 | Cowings et al. |
| 2009/0100523 | A1 | 4/2009 | Harris |

OTHER PUBLICATIONS

J. Oliver. "Using lexigraphical distancing to block spam" in Presentation at MIT Spam Conference. Cambridge, MA. Jan. 21, 2005.

H. Lee and Andrew Y. Ng. "Spam Deobfuscation using a Hidden Markov Model". In web proceedings of Conference of Email and Anti-Spam, Palo Alto 2005.

R. Kohavi. "The power of decision tables" in European Conference on Machine Learning, 1995.

Hall, M., et al.,"Practical Feature Subset Selection for Machine Learning", pp. 11, 1998.

Fayyad, U. M., and Irani, K. B. 1993. Multi-interval discretization of continuous-valued attributes for classification learning. In Proceedings of the 13th Int. Joint Conference on Artificial Intelligence, 1022-1027 Morgan Kaufmann.

A compilation of various string similarity metrics at http://www.dcs.shef.ac.uk/~sam/stringmetrics.html.

G. Rios and H. Zha. "Exploring SVM and Random Forest for Spam Detection", in web proceedings of Conference of Email and Anti-Spam, Palo Alto 2004.

V. Sharma, P. Sarda and S. Sharma. "An Add-on to Rule Based Sifters for Multi Recipient Spam Emails". NLDB 2005: 361-364.

John Graham-Cumming, "The Spammers' Compendium", Spam Conference 2003.

Online document "Guide to Weka", Mar. 15, 2005 at http://www.andy-roberts.net/teaching/db32/weka-db32.pdf.

Schwartz, R., "Finding Similar Images" Perl of Wisdom, Linux Magazine, Aug. 14, 2003, pp. 1-6; www.linux-mag.com/index2.php?option=com_content&task=view&id=1424&Itemid-221....

Office Action from U.S. Appl. No. 11/444,543, mailed May 20, 2009, 12 pages.

Office Action from U.S. Appl. No. 11/444,543, mailed Feb. 25, 2010, 15 pages.

"Proofpoint MLX Whitepaper", *Proofpoint MLX Machine Learning to Beat Spam Today and Tomorrow*, Copyright 2006, 28 pages.

Office Action from U.S. Appl. No. 11/444,543, mailed Jul. 18, 2011, 34 pgs.

Chapman, Sam, "A compilation of various string similarity metrics", http://www.dcs.shef.ac.uk/~sam/stringmetrics.html, copyright 2006, 15 pages.

\* cited by examiner

APPARATUS AND METHOD FOR AUXILIARY CLASSIFICATION FOR GENERATING FEATURES FOR A SPAM FILTERING MODEL

BACKGROUND

1. Field of the Invention

This invention relates to electronic message analysis and filtering. More particularly, the invention relates to a system and method for improving a spam filtering feature set.

2. Description of the Related Art

"Spam" is commonly defined as unsolicited bulk e-mail, i.e., email that was not requested (unsolicited) and sent to multiple recipients (bulk). Although spam has been in existence for quite some time, the amount of spam transmitted over the Internet and corporate local area networks (LANs) has increased significantly in recent years. In addition, the techniques used by "spammers" (those who generate spam) have become more advanced in order to circumvent existing spam filtering products.

Spam represents more than a nuisance to corporate America. Significant costs are associated with spam including, for example, lost productivity and the additional hardware, software, and personnel required to combat the problem. In addition, many users are bothered by spam because it interferes with the amount of time they spend reading legitimate e-mail. Moreover, because spammers send spam indiscriminately, pornographic messages may show up in e-mail inboxes of workplaces and children—the latter being a crime in some jurisdictions. Recently, there has been a noticeable increase in spam advertising websites which contain child pornography. "Phishing" emails are another type of spam that request account numbers, credit card numbers and other personal information from the recipient.

1. Real-Time Spam Filtering

Various techniques currently exist for filtering spam. Specifically, FIG. 1 illustrates an exemplary spam filtering architecture which includes an email analyzer module 101, a mathematical model module 102 and a message processing module 103.

The email analyzer module 101 analyzes each incoming email message to determine whether the email message contains one spam-like "features." Features used in content-based spam filters can be divided into three basic categories:

(1) Header information: Features that describe the information path followed by a message from its origin to its destinations as well as Meta information such as date, subject, Mail Transfer Agents (MTA), Mail User Agents (MUA), content types, etc.

(2) Message body contents: Features that describe the text contained in the body of an email, such as words, phrases, obfuscations, URLs, etc.

(3) Meta Features: Boolean Combinations of Other Features Used to Improve Accuracy Once the features of an email message have been identified, a mathematical model 102 is used to apply "weights" to each of the features. Features which are known to be a relatively better indicator of spam are given a relatively higher weight than other features. The feature weights are determined via "training" of classification algorithms such as Naïve Bayes, Logistic Regression, Neural Networks, etc. Exemplary training techniques are described below with respect to FIG. 2.

The combined weights are then used to arrive at a spam "score." If the score is above a specified threshold value, then the email is classified as spam and filtered out by message processing module 103. By contrast, if the score is below the specified value, then the spam processing module forwards the email on to a user's account to the email server 104.

2. Training

As mentioned above, the weights applied to features within the feature set are determined through a process known as "training." Different algorithms use different methods of weight calculation including maximum entropy, error back-tracking, etc. The spam model is regularly trained in order to assign weights to newly extracted features and update the weights associated with older features. Regular training helps to keep the weights of features updated according to the latest spam techniques in use.

FIG. 2 illustrates an exemplary training scenario which employs machine learning, a training technique developed by the assignee of the present patent application. See, e.g., Proofpoint MLX Whitepaper (2005), currently available at www.proofpoint.com. In this scenario, an email training corpus 200 containing known spam and ham messages is provided as a data source. A feature detection module 201 identifies features from the feature set within each email and provides this information to a machine learning module 202. The machine learning module 202 is also told whether each message is spam or ham. Using this information, the machine learning module 202 calculates a correlation between the features and spam messages, i.e., it determines how accurately certain features identify spam/ham. As mentioned above, various machine learning algorithms may be used such as Naïve Bayes, Logistic Regression, Neural Networks, etc.

The calculations performed by the machine learning module 202 are expressed in the form of a weight file 203 which associates a weight with each of the features in the feature set. For example, features which identify spam with relatively greater accuracy (e.g., "buy Viagra") are provided with relatively larger weights than other features (e.g., "visit online"). The weight file is subsequently used to perform spam filtering operations as described above.

3. Obfuscation Techniques

One of the famous tricks of fooling spam filters that rely on machine learning is to introduce random text or noise in the email text. For example, "Viagra" is spelled "V|@gr@" and "mortgage" is spelled "m_o_r_t_g-a-g-e." The problem of obfuscation becomes quite cumbersome because there are virtually endless ways to obfuscate a given word using various combinations of tricks and characters.

These common tricks include, for example:
1) Substitution: Viagra→V|@gra
2) Addition: Viagra→Viaagraa
3) Deletion: Viagra→Vigra
4) Shuffling: Viagra→Vgiara
5) Segmenting: Viagra→V I A G R A
6) Combination: Viagra→V !@ gra There are at least two methods currently employed to counter the text obfuscation problem. The first method is to de-obfuscate the spam message as a preprocessing step of classification. That is, converting an obfuscated word like "v|@graa" back to its original form "Viagra" so that the email filter can recognize the true words. Another technique to counter obfuscation is to identify the obfuscated words in an email and use them as an indication of spam. So, if a word "Viagra" was intentionally written as "v|@graa" then this knowledge can be used by the spam classifier as a feature.

Converting obfuscated words to their true form seems like an excellent way of handling the problem and the results of previous research have also reported a de-obfuscation accuracy of 94%. However, there are certain drawbacks that make this solution impractical for the larger spam filters. First, this technique is extremely expensive. The previous study reports a de-obfuscating rate of 240 characters/sec using 70 characters including 26 letters of the alphabet, space, and all other standard ASCII characters, but excluding control characters. This rate of de-obfuscation is very slow for a preprocessing stage of a large-scale spam classifier which may receive millions of daily emails each of which may contain 1000 s of characters. In addition, in practice, significantly more than 70 characters such as foreign language characters are used in obfuscation, further exacerbating the problem.

Using a slow and computationally expensive preprocessing technique will increase both email delivery time and hardware requirements. This not only makes the solution more expensive for the end user but it also creates severe performance issues for service providers.

Taking the above constraints into consideration, another technique to counter obfuscation is to identify the obfuscated words in an email and use them as an indicative of spam. The idea here is simple; include all of the obfuscated words in the feature set of the spam classifier. Thus, the correct classification of the above email example uses t0night, R01ex, Viissit On!ine and Cl!!ck here in the feature set of the spam filter. Manually adding these words or using regular expressions to catch them is not only expensive to maintain but is also a short-term goal, as the life of each obfuscated word is very short because spammers frequently change the obfuscation of a word.

A better solution would be an intelligent system driven by machine learning that can identify such words. Such a classifier has previously been used but has a low success rate of around 70%-75%. With respect to computational performance, detecting obfuscation provides better results than de-obfuscation as discussed below.

The foregoing discussion concludes that there is a tradeoff between accuracy and the computational performance in current solutions for obfuscation. Accordingly, improved techniques for detecting obfuscation are needed. Keeping this tradeoff into consideration, the embodiments of the invention described below employ a model with high obfuscation detection accuracy and with low computational complexities. Only such a model will fit the needs of a real world enterprise class spam solution. In addition to the obfuscation detection model, a general architecture is described below for integrating auxiliary spam detection models within the context of a base spam detection model.

SUMMARY

A computer-implemented system and method are described for integrating a series of auxiliary spam detection models with a base spam detection model, thereby improving the accuracy and efficiency of the overall spam detection engine. For example, a system according to one embodiment of the invention comprises: a base spam filter feature extractor to detect a first set of features from incoming email messages; one or more auxiliary model feature extractors, each of the auxiliary model feature extractors to detect a different set of features from the incoming email messages; one or more auxiliary detection modules, each of the auxiliary detection modules to receive an indication of the different sets of features detected by a corresponding one of the auxiliary model feature extractor modules and to apply weights to the detected features; and a base spam filter module to receive an indication of the first set of features from the base spam filter feature extractor and the weights generated by the auxiliary detection modules, the base spam filter module to assign base spam filter weights to the first set of features and to determine whether an email message is spam based on the weights of the first set of features and the weights of the different set of features identified by the auxiliary model feature extractors.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

As described above, a tradeoff exists between accuracy and computational performance in current obfuscation detection solutions. Keeping this tradeoff in mind, the embodiments of the invention described below employ a model with high obfuscation detection accuracy and with low computational complexities. Only such a model will fit the needs of a real world enterprise class spam solution.

1. Integration of the Obfuscation Detection Model Within a Base Spam Filtering Architecture The obfuscation detection model employed in one embodiment of the invention is an auxiliary, supervised classification model to the general spam filtering model. The goal of the model is to classify words in an email in two classes, "obfuscated" or "true," and to provide this information to the spam classifier as one or more features.

Figure 3:
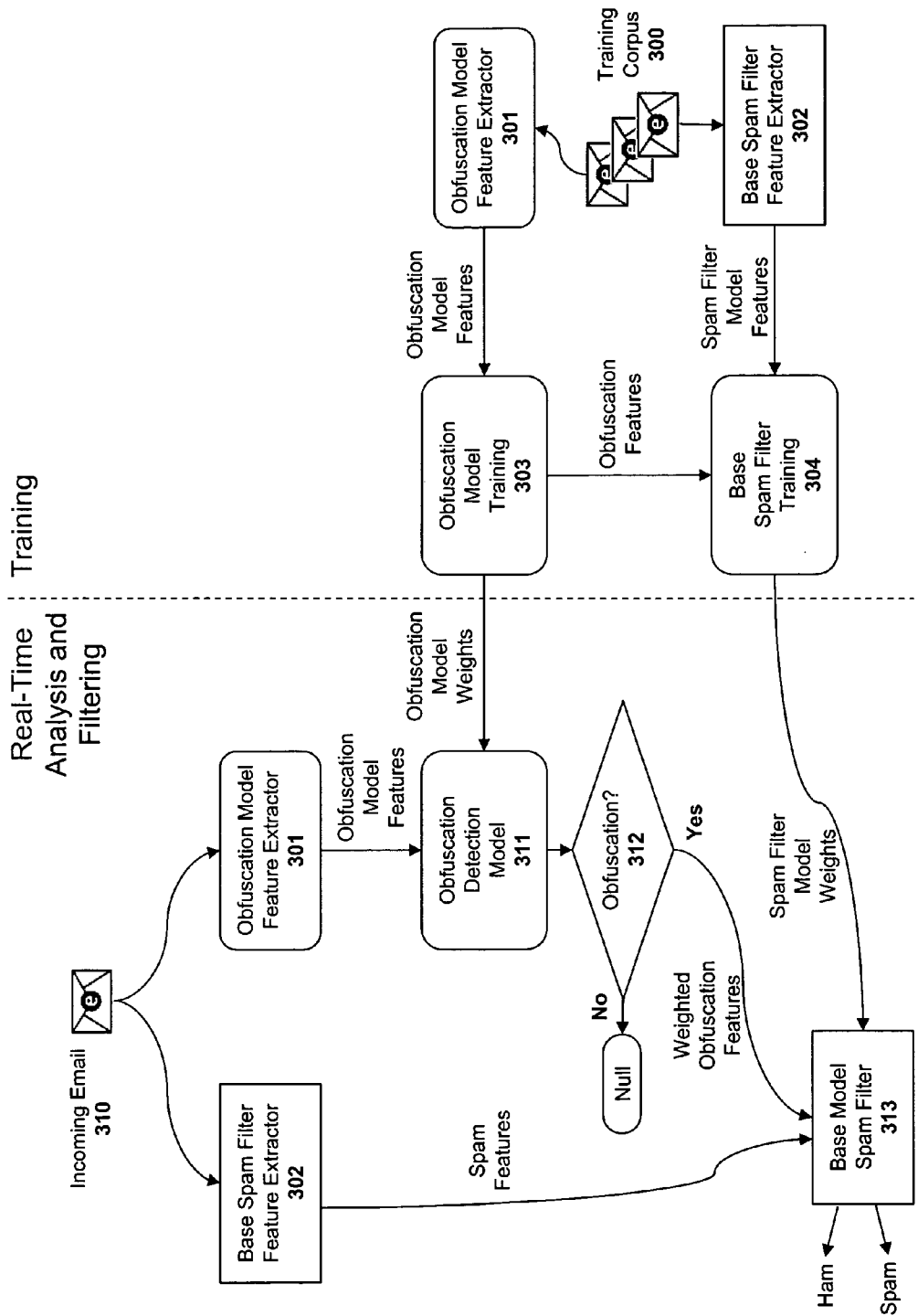
FIG. 3 illustrates a spam training and filtering architecture using one auxiliary classifier according to one embodiment of the invention.

FIG. 3 illustrates how the obfuscation detection model 311 is integrated within a spam filtering architecture according to one embodiment of the invention. As part of the training process, an obfuscation model feature extractor 301 identifies obfuscation model features from a training corpus 300 comprised of ham messages and spam messages with known obfuscated words. Specific details are provided below related to the number and type of ham and spam messages used in the training corpus 300.

The detected obfuscation model features are provided to an obfuscation model training module 303 which, in one embodiment, performs machine learning operations to generate obfuscation model weights. Various machine learning algorithms which may be used by the obfuscation model training module 303 are described below. The weights may be stored in a weight file and used by the obfuscation detection model 311 during real-time email analysis and filtering.

Figure 2:
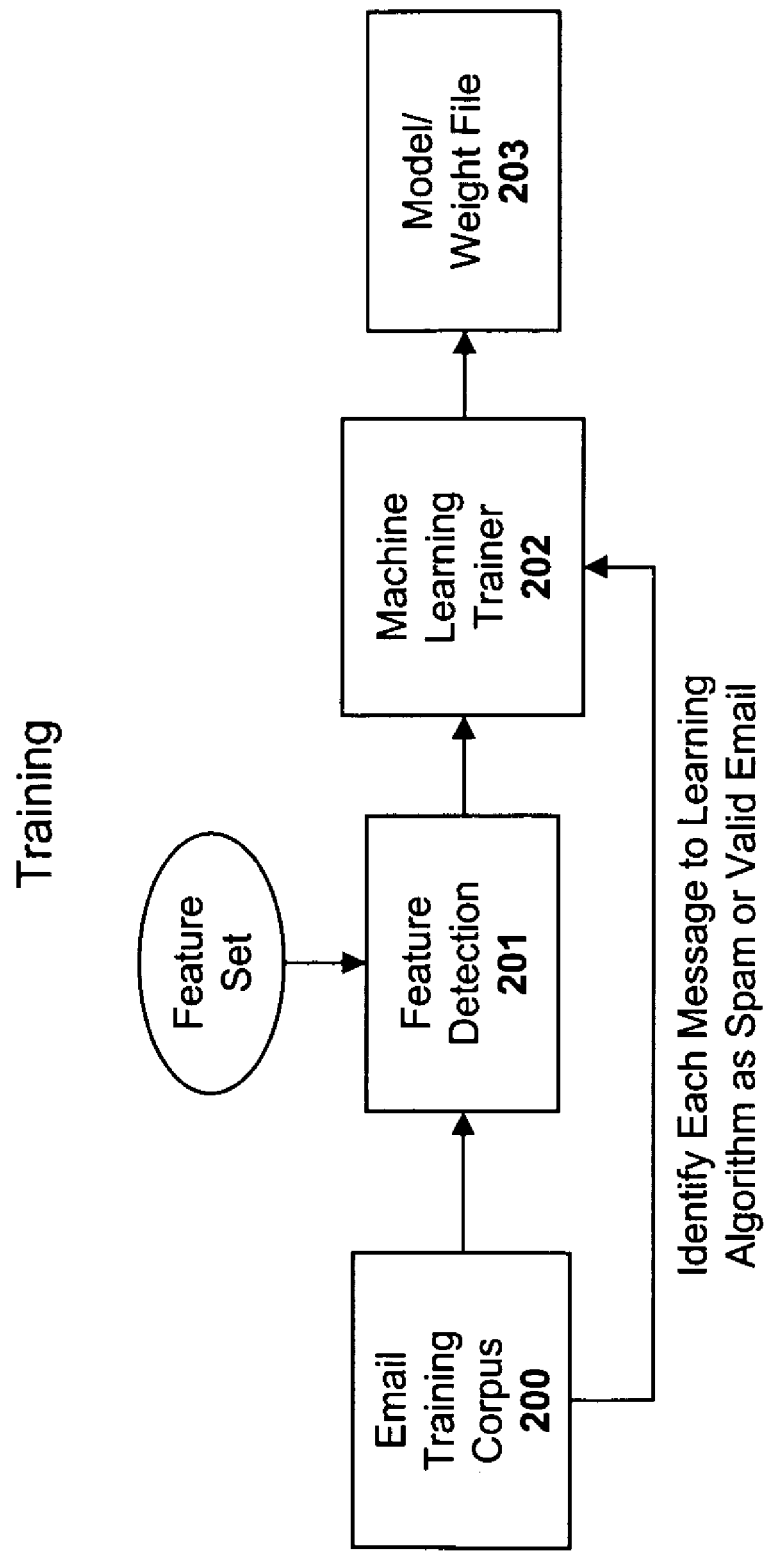
FIG. 2 illustrates an exemplary architecture for training using machine learning techniques.

In addition, a spam filter feature extractor 302 identifies spam filter model features from the training corpus 300. A spam filtering model training module 304 executes machine learning operations on the detected features to generate a set of spam filter model weights (e.g., as described above with respect to FIG. 2).

In operation, the obfuscation model feature extractor 301 identifies obfuscation model features from incoming email messages 310 and provides an indication of those features in real-time to the obfuscation detection model 311. The obfuscation detection model 311 applies the previously-generated weights to each of the detected features and, if obfuscation exists (determined at 312), provides an indication of the weighted obfuscation features to the main spam filter module 313.

Figure 1:
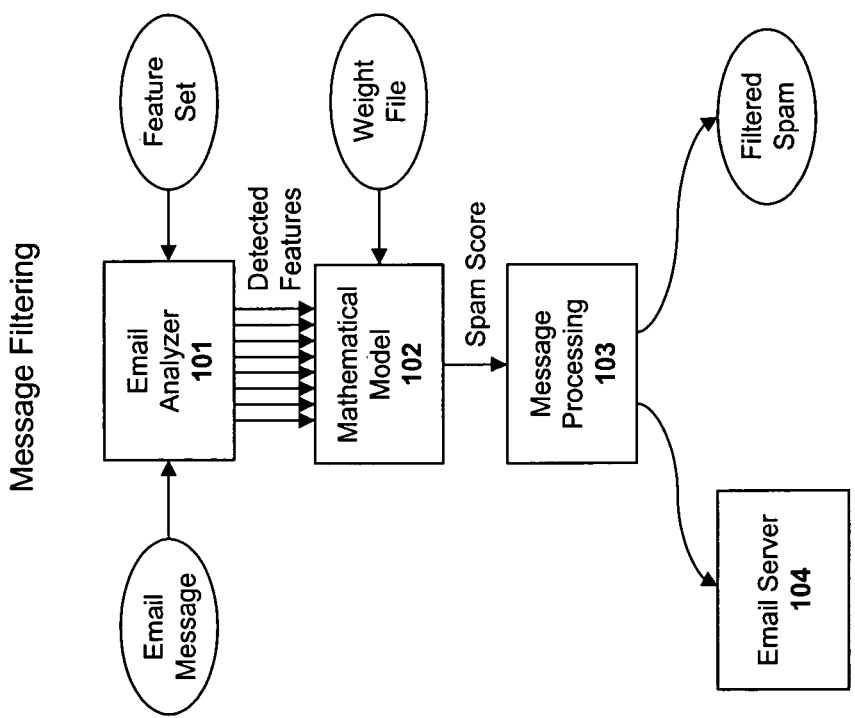
FIG. 1 illustrates an architecture of an exemplary prior art email filtering system.

The spam filter feature extractor 302 identifies spam features within the incoming email messages 310 and provides an indication of these features to the main spam filter module 313. The spam filter module 303 then applies the spam filter model weights to each of the detected features and, in combination with the weighted obfuscation features, determines whether an email message is spam or ham (e.g., by generating a "score" for the email message as described above with respect to FIG. 1).

By way of example, the following email message will be analyzed within the context of FIG. 3:

John, do you have a date t0night? Impress her with your new R01eX. Viissit On!ine to get it free at Cl!!ck here.

This email will be processed by the spam filter feature extractor 302 to extract the features used by the base spam classifier within spam filter 313. Simultaneously, to detect obfuscation as a feature for the spam classifier, the email will be parsed into a list of words and these words will be processed by the obfuscation model feature extractor 301. Each word is then converted into a feature vector where, in one embodiment, the feature space consists of the binary attributes described below. The obfuscation model weight's file will be used by the obfuscation detection model 311 to score each word. If the score is greater than a predefined threshold, then the word is classified as "obfuscated" at 312.

Words may be classified in different categories based on the score of the word. Assume, for example, that "impress" scores 0, "t0night" scores 70 and "R01 ex" score 95. This indicates that the obfuscation model 311 is less confident about "t0night" being obfuscated but it is certainly confident about "R01 ex" being obfuscated. Hence a spam feature representing high obfuscation or "<highobfs>" will be fired for "R01 ex" and average obfuscation or "<avgobfs>" for "t0night." Since obfuscation model is confident that "impress" is a true word, it will not fire any feature for the spam classifier 313. As described above, the weights associated with each of these features is determined through obfuscation model training 303.

2. Dataset

The "dataset" refers to the training corpus 300 of ham and spam email messages. In one embodiment, for obfuscation training, the dataset includes 67907 obfuscated words manually extracted from spam emails and 250,000 true words randomly parsed from a ham corpus of 10,000. The proportion of the true words is set higher based on the intuition that the ratio of true words will be much higher than the obfuscated words in current emails. A dictionary of 12,000 commonly used words selected from various public domains and a list of 727 frequently obfuscated words ("FOW") was also used for feature extraction.

2.1 Frequently Obfuscated Words

Spammers attempt to hide certain specific words like Viagra, Rolex, mortgage etc., from text based spam filters. These words form the basic content of the email and are frequently obfuscated. In one embodiment of the invention data mining is performed on obfuscated words manually collected from spam emails over a specified time period (e.g., 2 years). Currently, 727 such words have been identified, although the underlying principles of the invention may be implemented using any number of words. For reference we call such words as "frequently obfuscated words" (FOW).

One embodiment of the invention detects any variation of these FOW rather than detecting obfuscation of every word to solve the efficiency problems with prior obfuscation detection techniques. Using the set of FOW in obfuscation detection also reduces the impact of spelling mistakes on classification errors since the classification model will give more weight to the variation of FOW then to variations of other words or misspellings. This list may be increased over time if a new word that is not currently present in the list is being frequently obfuscated in the current emails.

3. Feature Set

In one embodiment of the invention, each instance in the training dataset (e.g., 67907 obfuscated words and 250,000 true words) is converted into a feature vector of 13 different features, generated from the following five parameters:

A: The similarity of the filtered word with FOWs measured as a numerical value between 0 and 1 (explained in section 2.1 below)

B: The number of non-alphanumeric characters in the word (e.g., $, @, &, etc)

C: The length of the word

D: The number of digits in the word excluding the boundaries

E: The dictionary presence of the filtered word as {0,1}

3.1 Similarity Metric (A)

The following set of operations are used in one embodiment of the invention to determine the "similarity" of a word with each of the FOWs. Let L be the list of FOW; $L \in \{l_i\}$, where $l_i$ is any frequently obfuscated word. The similarity of any test word m with the words present in the list L is to be estimated. The word m should be filtered so that it does not contain any non-alphanumeric characters and digits. Let $b_i$ be the length of any word $l_i$ present in L and $b_m$ be the length of the word m. Let b be the number of common characters in $l_i$ and m. One character of each string is allowed to match with only one character of the other, thereby ensuring sure that the metric is not overestimated due to repeating characters and longer words. A similarity index $S_{im}$ is defined as the similarity of the word m with the word $l_i$ and is given as:

$$S_{im} = b(b_i + b_m - b)$$

According to the nature of metric the value of $S_{im}$ is always between 0 and 1. A value of 0 represents no similarity and a value of 1 represents complete similarity. $S_{im}$ is calculated for all the present in the list L and the maximum value of $S_{im}$ is reported and used as A in the obfuscation classification model.

By way of example, and not limitation, let $L \in \{Viagra, mortgage\}$ and let m be "virag@a." Filtering m produces m="viraga." For $l_1$=Viagra, $b_1$=length (Viagra)=6 and $b_m$=length (viraga)=6. The number of common characters is a one-to-one match (i.e., b=6) and hence $$S_1 = 6/(6+6-6) = 1.0$$

Similarly, for $l_2$=mortgage, $b_1$=8, $b_m$=6 and b=3 and hence $$S2 = 3/(8+6-3) = 0.2727$$

Hence $S_{virag@a}$=maximum (1.0, 0.2727)=1.0

Since a very common method of obfuscating a word is shuffling its characters leaving the boundary character intact, any metric that gives more weights to order may cause errors related to obfuscation (e.g., metrics such as Levenshtein Distance, Jaro Winkler, etc, are extremely sensitive towards ordered variations).

3.2 Feature Generation

In one embodiment of the invention, a sample of 118,333 instances was randomly selected from the training dataset containing examples of both the classes (obfuscated and true). These examples were converted into feature vectors where the feature space consisted of the five parameters defined above.

Fayyad & Irani's MDL method of discretization was applied on these instances. See, e.g., Fayyad, U. M., and Irani, K. B. 1993. Multi-interval discretization of continuous-valued attributes for classification learning. In Proceedings of the 13th Int. Joint Conference on Artificial Intelligence, 1022-1027 Morgan Kaufmann. After discretization, a distribution of the dataset was plotted with respect to each parameter and cut-points or bins were selected based on the maximum distribution of each class between those cut-points.

By way of example, after applying discretization on the "similarity" parameter 'A', the value of 'A' may be plotted for each instance in the training set. Looking at the plot, for A>0.710084, the distribution of obfuscated words is almost 100%. The exact value of the probability of a word being obfuscated if the value for A>0.710084 for the sample dataset used is 0.991759. Hence, A1 =0.710084 may be selected as a cut-point for parameter 'A'.

Applying the same process on the "length" parameter C, two cut-points were identified, $C_1$=4 and $C_2$=13. Approximately 97% of the words having a length below $C_1$ were true words and approximately 98% of the words above $C_1$ were obfuscated words. In one embodiment of the invention, the same process is applied to evaluate and establish cut-points for other parameters.

In one embodiment of the invention, using the parameters and cut-points, a set of binary features $F_i$ are generated. By way of example, the following feature may be employed in one embodiment of the invention:

If A>0.710084 and B>1 then $F_1$=HIGHOBFS

This attribute is the mathematical representation of the fact that if the similarity metric is greater than 0.710084 (highly similar to one of a FOW) and the number of non alpha numeric characters are greater than 1 then the probability of the words being obfuscated is very high, or feature $F_1$=HIGHOBFS.

The following is another exemplary feature which may be generated and used in accordance with the underlying principles of the invention:

If D+B=C then F2=DATERULE etc

This attribute states that if the sum of the number of digits in the word and the number of non-alphanumeric characters in the word is equal to the length of the word, then the word contains no alphabetic characters and hence the feature F2=DATERULE. In other words, this is a name for the feature that represents the property of any word in an email that has no alphabetic characters (e.g., date, ids, social security numbers, etc).

In one embodiment of the invention, 13 more attributes were generated based on the properties of the obfuscated and true words. The training dataset was converted into vectors of these 15 binary features and was used for training.

A list of the 15 features and the conditions when each one of them will fire is provided below. It is to be noted that each word in an email will fire one or more of these features and the combinations of these features will decide whether a word is obfuscated or not. The weight of each of these 15 features is determined via the obfuscation model training described herein. It should also be noted that various other and/or additional features may be used while still complying with the underlying principles of the invention.

Feature 1: C<=4→Feature "Length4"
Feature 2: C>=13→Feature "Length13"
Feature 3: B>1→Feature "alpha2"
Feature 4: B==1→Feature "alpha1"
Feature 5: B==0→Feature "alpha0"
Feature 6: D>=3→Feature "dig3"
Feature 7: D==1→Feature "dig1"
Feature 8: D==2→Feature "dig2"
Feature 9: D==0→Feature "dig0"
Feature 10: A>0.710084→Feature "Highedit"
Feature 11: 0.5<A<0.710084→Feature "Avgedit"
Feature 12a: A<0.5→Feature "Lowedit"
Feature 12b: A==1 and E==1 and B+D==0→Feature "Lowedit"
Feature 13: A==1 and B+D>0→Feature "HIGHOBFS"
Feature 14: E==1→Feature "LOWOBFS"
Feature 15: C−B−D==0→Feature "DATERULE"

3.3 Learning Model

Different multivariate classification techniques may be used to train the model while still complying with the underlying principles of the invention. The test accuracy of the different techniques may be estimated using cross validation. Weka was used for experimentation. See, e.g., Ian H. Witten and Eibe Frank (2005) "Data Mining: Practical machine learning tools and techniques", 2nd Edition, Morgan Kaufmann, San Francisco, 2005.

Table 1 provides an exemplary comparison of 6 different classifiers on the obfuscation detection problem. The confusion matrix column provides the distribution of errors. See, e.g., Ian H. Witten and Eibe Frank (2005) "Data Mining: Practical machine learning tools and techniques", 2nd Edition, Morgan Kaufmann, San Francisco, 2005. Two classes of words are indicated: obfuscated (o) and non-obfuscated/true (t).

TABLE 1

| Classifier | Accuracy (%) | Confusion Matrix a = t b = o | |
| --- | --- | --- | --- |
| Naive Bayes | 92.3748 | 8906 1850<br>912 24554 | a = t<br>b = o |
| C4.5 | 94.1638 | 8652 2104<br>10 25456 | a = t<br>b = o |
| Decision Table | 94.1941 | 8680 2076<br>27 25439 | a = t<br>b = o |
| Random Forest | 94.1969 | 8671 2085<br>17 25449 | a = t<br>b = o |
| Logistic Regress | 96.843 | 8961 1795<br>649 25817 | a = t<br>b = o |
| Bayesian Networks | 90.9171 | 8689 2067<br>1223 24243 | a = t<br>b = o |

It can be seen from the table that logistic regression provided the best classification accuracy with lowest false positive rate and hence was used as a trainer and weights were generated for the 13 binary attributes used in obfuscation detection model.

The obfuscation detection model is designed to use the domain knowledge of frequently obfuscated words. Using this domain knowledge and preprocessing steps like discretization of the attributes, the obfuscation detection model can attain a high classification accuracy (e.g., 94%).

4. Auxiliary Spam Filtering Classification Models

This obfuscation classification model described above is used as an auxiliary classifier to the base spam classification model. Specifically, it is used to detect obfuscation as a feature for the base classifier. Using an auxiliary classifier for feature generation helps to reduce the impact of signature-based approach and makes the base classifier more predictive.

The use of auxiliary classification for feature generation is not limited to an obfuscation classification model. Rather, virtually any type and number of auxiliary classifiers may be used to analyze characteristics of email messages and generate features for the base classifier (e.g., IP address analysis, URL analysis, spam image detection, or any spam feature that has pattern in it and can be detected using pattern recognition, etc).

Figure 4:
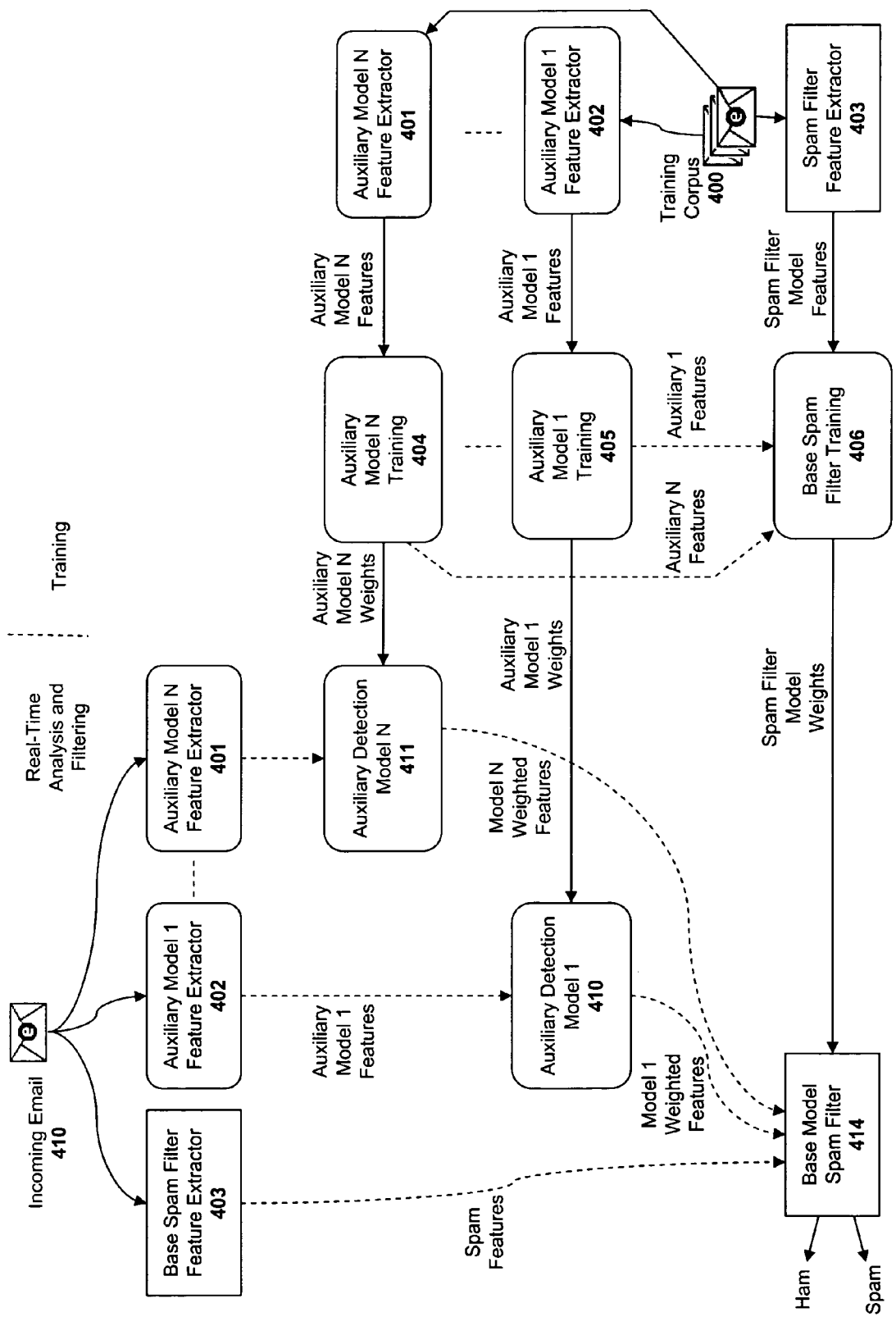
FIG. 4 illustrates a spam training and filtering architecture using N auxiliary classifiers according to one embodiment of the invention.

FIG. 4 illustrates one embodiment of a generalized auxiliary classification architecture which includes N different auxiliary detection models 410-411 (only auxiliary detection models 1-N are shown for simplicity). As part of the training process, N auxiliary model feature extractors 401-402 identify auxiliary model features from a training corpus 400 comprised of ham messages and spam messages with certain known characteristics (e.g., obfuscated words in the case of the obfuscation model described above). The features detected by the N auxiliary model extractors 401-402 are used by N individual auxiliary training models 404-405, respectively (again, only training models 1 and N are shown for simplicity). In one embodiment, the N auxiliary training models 404-405 performs machine learning operations to generate obfuscation model weights. Different machine learning algorithms may be used by different auxiliary training models 404-405, based on the nature of the problem being solved. For example, as described above, logistic regression is particularly suitable for the obfuscation model problem, but it may not be as useful for other types of problems. For example, unsupervised clustering algorithms or principle component analysis is more suitable for image detection problems. The weights may be stored in a weight file (or series of weight files) and used by the N auxiliary detection models 410-411 during real-time email analysis and filtering.

In addition to the auxiliary model training, in one embodiment of the invention a base spam filter feature extractor 403 identifies base spam filter model features from the training corpus 400. A base model training module 406 executes machine learning operations on the detected features to generate a set of spam filter model weights (e.g., as described above with respect to FIG. 2).

In operation, the N auxiliary model feature extractors 401-402 identify different model features from incoming email messages 409 and provide an indication of those features in real-time to the corresponding auxiliary detection models 410-411, respectively. The auxiliary detection models 410-411 apply the previously-generated weights to each of the detected features and provide an indication of the weighted model features to the base spam filter module 414.

At the same time, the base spam filter feature extractor 403 identifies spam features within the incoming email messages 410 and provides an indication of these features to the base spam filter module 414. The base spam filter module 414 then applies the spam filter model weights to each of the detected features and, in combination with the weighted features provided by the auxiliary detection modules 410-411, determines whether an email message is spam or ham (e.g., by generating a "score" for the email message as described above with respect to FIG. 1).

Mathematically, the use of auxiliary classification models can be expressed as follows. Let p(S/X) be the probably of a message being spam given X which is the feature space.

Feature space X can have many features as $X_1, X_2, X_3$ and so on. Taking an example of Bayesian Classification this probability may be expressed as:

$$p(S/X) = p(X/S)P(S)/(p(X/S)p(S) + p(X/S')p(S'))$$

$$p(X/S) = p(X,S)/p(S)$$

Under the assumption of attribute independence:

$$P(X,S) = p(S) * p(X_1/S) * p(X_2/S) \ldots * p(X_3/S)$$

Using the foregoing three equations, we can solve the probability of a class given the attribute set and dataset. In this example, $p(X_1/S)$ is simply the ratio of X1 seen in the data set over the total size of dataset. For example, if the total number of spam emails (S) was 1000 and we see a feature 'vIagra" in 10 spam emails then p(vIagra/S)=10/1000

With respect to obfuscated words, there can be hundred of thousands of such words like 'vIagra'. Using a signature approach we will have to calculate the probability for each one of them and substitute its value in the base equation. This becomes very tedious and error prone if the number of such words keeps on increasing and changing.

Embodiments of the invention may include various steps as set forth above. The steps may be embodied in machine-executable instructions which cause a general-purpose or special-purpose computer processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although some embodiments described above employ a specific set of frequently obfuscated words, the underlying principles of the invention are not limited to any particular set of words. In addition, although the embodiments of the invention described above focus on detecting spam email messages, the underlying principles of the invention may be employed in a variety of other fields including spam web page detection and other content-based classification problems. Similarly, the auxiliary classification techniques described above may be used to detect the features for any machine learning problem—not just problems related to spam detection and filtering. Moreover, it should be noted that the underlying principles of the invention may be implemented within virtually any time of computing platform including standard personal computer configurations and server configurations.

Accordingly, the scope and spirit of the invention should be judged in terms of the claims which follow.

What is claimed is:

1. A system for filtering spam email messages, the system comprising: a memory for storing program code and a processor for processing program code to generate a plurality of modules further comprising:
- a base spam filter feature extractor comprising first machine learning logic performing machine learning operations to detect base spam features from a training corpus of ham and spam email messages the base spam filter feature extractor performing the operations of:
  - analyzing an email message to detect whether the email message contains features within a base spam feature set;
  - firing one or more of the base spam features based, at least in part, on the analysis;
  - assigning a weight to each of the base spam features according to how well the base spam features correctly differentiate between ham and spam email messages;
- an auxiliary obfuscation model feature extractor comprising second machine learning logic performing machine learning operations to detect text obfuscation within the training corpus of ham and spam email messages, the auxiliary obfuscation model feature extractor comprising an obfuscation feature set for detecting obfuscation within email messages, the auxiliary obfuscation model feature extractor performing the operations of:
  - analyzing an email message to detect whether the email message contains features within the obfuscation feature set;
  - firing one or more of the obfuscation detection features based, at least in part, on the analysis;
  - assigning a weight to each of the obfuscation detection features according to how well the obfuscation detection features correctly detect text obfuscation in email messages;
- an auxiliary obfuscation detection module to receive an indication of the different sets of features and associated weights detected by the auxiliary obfuscation model feature extractor and to apply the associated weights to the detected features in a stream of incoming email messages; and
- a base spam filter module to receive an indication of the base spam features and associated weights from the base spam filter feature extractor and the weights applied by the auxiliary obfuscation detection module to the stream of incoming email messages, the base spam filter module to apply base spam filter weights to the base spam features detected in the stream of incoming email messages and to determine whether an email message is spam based on a combined weights of the base spam features and the weights of the obfuscation features applied by the auxiliary obfuscation detection module;
- summing the weights of the base spam features and the weights of features applied by the auxiliary obfuscation model feature extractor to generate a spam score; and
- identifying the email message as spam if the spam score is above a specified threshold value.

2. The system as in claim 1 wherein the auxiliary obfuscation model feature extractor and the base spam filter feature extractor each implement different types of machine learning algorithms to calculate the weights of the features.

3. The system as in claim 1 wherein
the training corpus is comprised of a first plurality of known spam email messages and a second plurality of known ham email messages, the training corpus used by the first and second machine learning logic to generate the base spam and obfuscation features and the weights associated with each of the features.

4. A computer-implemented method for filtering spam email messages comprising:
- providing a base spam filter feature extractor executed by a processor, comprising first machine learning logic performing machine learning operations to detect base spam features from a training corpus of ham and spam email messages the base spam filter feature extractor performing the operations of:
  - analyzing an email message to detect whether the email message contains features within a base spam feature set;
  - firing one or more of the base spam features based, at least in part, on the analysis;
  - assigning a weight to each of the base spam features according to how well the base spam features correctly differentiate between ham and spam email messages;
- providing an auxiliary obfuscation model feature extractor comprising second machine learning logic performing machine learning operations to detect text obfuscation within the training corpus of ham and spam email messages, the auxiliary obfuscation model feature extractor comprising an obfuscation feature set for detecting obfuscation within email messages, the auxiliary obfuscation model feature extractor performing the operations of:
  - analyzing an email message to detect whether the email message contains features within the obfuscation feature set;
  - firing one or more of the obfuscation detection features based, at least in part, on the analysis;
  - assigning a weight to each of the obfuscation detection features according to how well the obfuscation detection features correctly detect text obfuscation in email messages;
- providing an auxiliary obfuscation detection module to receive an indication of the different sets of features and associated weights detected by the auxiliary obfuscation model feature extractor and to apply the associated weights to the detected features in a stream of incoming email messages; and
- providing a base spam filter module to receive an indication of the base spam features and associated weights from the base spam filter feature extractor and the weights applied by the auxiliary obfuscation detection module to the stream of incoming email messages, the base spam filter module to apply base spam filter weights to the base spam features detected in the stream of incoming email messages and to determine whether an email message is spam based on a combined weights of the base spam features and the weights of the obfuscation features applied by the auxiliary obfuscation detection module;
- summing the weights of the base spam features and the weights of features applied by the auxiliary obfuscation model feature extractor to generate a spam score; and
- identifying the email message as spam if the spam score is above a specified threshold value.

5. The method as in claim 4 wherein the auxiliary obfuscation model feature extractor and the base spam filter feature extractor each implement different types of machine learning algorithms to calculate the weights of the features.

6. The method as in claim 4 wherein
the training corpus is comprised of a first plurality of known spam email messages and a second plurality of known ham email messages, the training corpus used by the first and second machine learning logic to generate the base spam and obfuscation features and the weights associated with each of the features.

7. A non-transitory machine-readable medium having program code stored thereon which, when executed by a machine, causes the machine to perform the operations of:

provideng a base spam filter feature extractor comprising first machine learning logic performing machine learning operations to detect base spam features from a training corpus of ham and spam email messages the base spam filter feature extractor performing the operations of:

analyzing an email message to detect whether the email message contains features within a base spam feature set;

firing one or more of the base spam features based, at least in part, on the analysis;

assigning a weight to each of the base spam features according to how well the base spam features correctly differentiate between ham and spam email messages;

providing an auxiliary obfuscation model feature extractor comprising second machine learning logic performing machine learning operations to detect text obfuscation within the training corpus of ham and spam email messages, the auxiliary obfuscation model feature extractor comprising an obfuscation feature set for detecting obfuscation within email messages, the auxiliary obfuscation model feature extractor performing the operations of:

analyzing an email message to detect whether the email message contains features within the obfuscation feature set;

firing one or more of the obfuscation detection features based, at least in part, on the analysis;

assigning a weight to each of the obfuscation detection features according to how well the obfuscation detection features correctly detect text obfuscation in email messages;

providing an auxiliary obfuscation detection module to receive an indication of the different sets of features and associated weights detected by the auxiliary obfuscation model feature extractor and to apply the associated weights to the detected features in a stream of incoming email messages; and providing a base spam filter module to receive an indication of the base spam features and associated weights from the base spam filter feature extractor and the weights applied by the auxiliary obfuscation detection module to the stream of incoming email messages, the base spam filter module to apply base spam filter weights to the base spam features detected in the stream of incoming email messages and to determine whether an email message is spam based on a combined weights of the base spam features and the weights of the obfuscation features applied by the auxiliary obfuscation detection module;

summing the weights of the base spam features and the weights of features applied by the auxiliary obfuscation model feature extractor to generate a spam score; and identifying the email message as spam if the spam score is above a specified threshold value.

8. The machine-readable medium as in claim 7 wherein the auxiliary obfuscation model feature extractor and the base spam filter feature extractor each implement different types of machine learning algorithms to calculate the weights of the features.

9. The machine-readable medium as in claim 7 the training corpus is comprised of a first plurality of known spam email messages and a second plurality of known ham email messages, the training corpus used by the first and second machine learning logic to generate the base spam and obfuscation features and the weights associated with each of the features.

\* \* \* \* \*